Patented Dec. 7, 1926.

1,609,328

UNITED STATES PATENT OFFICE.

MAURICE C. TAYLOR, OF NIAGARA FALLS, NEW YORK, ASSIGNOR TO THE MATHIESON ALKALI WORKS, INC., OF NEW YORK, N. Y., A CORPORATION OF VIRGINIA.

MANUFACTURE OF HYPOCHLORITES.

No Drawing. Application filed October 29, 1924. Serial No. 746,667.

This invention relates to improvements in the manufacture of hypochlorites, such as calcium hypochlorite, and the invention includes improvements in processes of producing hypochlorites as well as improvements in certain novel steps of the process.

When chlorine reacts with an alkaline substance, such as lime, a part of the chlorine is converted into chloride and a part of the chlorine into hypochlorite. Commercial bleaching powder, for example, is a complex composition containing a part of its chlorine as chloride chlorine and a part of its chlorine in the form of hypochlorite chlorine. When bleaching powder is dissolved in water a solution containing calcium hypochlorite is formed, but calcium hypochlorite cannot be isolated by evaporation of such a solution as molecular compounds of calcium hypochlorite with calcium oxide and calcium chloride, originally present in the bleaching powder, again form. The presence of calcium chloride, which is inert as far as bleaching properties are concerned, is objectionable for the reason that it cuts down the effective bleaching value as compared with a product in which all of the chlorine is present in the form of hypochlorite chlorine. The presence of calcium chloride is further objectionable in that it decreases the stability of the bleaching powder.

In United States Letters Patents Nos. 1,481,039 and 1,481,040 there is described a method of producing substantially pure hypochlorites which involves the separation of hypochlorous acid from an aqueous solution containing hypochlorite chlorine and chloride chlorine by treatment with an intermediate compound which forms an extract of hypochlorous acid immiscible with the aqueous solution. The process of the present invention also involves the separation of hypochlorous acid from an aqueous solution containing chloride chlorine by treatment with an intermediate compound; and the present invention likewise provides a calcium hypochlorite product which is made up essentially of calcium hypochlorite with a minimum amount of impurities, the product being associated with a small quantity of free lime, but being substantially free from chloride or the complex molecular compounds found in bleaching powder.

According to the present invention, this calcium hypochlorite product, and hypochlorites of alkali forming or base forming metals, the alkalies and alkali earths, are produced by a method which involves the separation of hypochlorous acid from aqueous solutions by treatment with amine bases and the subsequent hydrolysis and treatment of the chloryl derivative formed between the hypochlorous acid and the amine base to produce hypochlorites. The process is applicable to the production of other hypochlorites besides calcium hypochlorite. The process also includes certain novel steps for the production of intermediate products, as well as improvements in a cyclic process of a character hereinafter more fully set forth.

Hypochlorous acid reacts with primary and secondary amines and with imines to produce chloramines and chlorimines according to the following general reactions, in which R and R' represent a hydrocarbon radical or derivative:

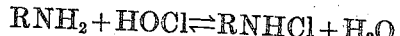
$$RNH_2 + HOCl \rightleftharpoons RNHCl + H_2O$$

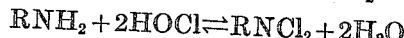
$$RNH_2 + 2HOCl \rightleftharpoons RNCl_2 + 2H_2O$$

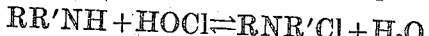
$$RR'NH + HOCl \rightleftharpoons RNR'Cl + H_2O$$

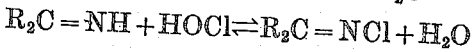
$$R_2C = NH + HOCl \rightleftharpoons R_2C = NCl + H_2O$$

These general reactions are somewhat reversible, and the direction in which the reaction proceeds can be controlled by appropriate regulation of the conditions surrounding the reactions. In the process of the present invention, reactions of this type are first employed for the separation of hypochlorous acid from chloride chlorine and are then employed for the recovery of the hypochlorous acid and the formation of hypochlorites with the separated hypochlorous acid.

The complete process of the invention, as applied to the manufacture of calcium hypochlorite, comprises the following steps:—1, the preparation of an aqueous solution containing hypochlorous acid or hypochlorite chlorine and containing chloride; 2, separation of the hypochlorous acid from the aqueous solution in the form of a chloryl derivative without removal of chloride; 3, treatment of the separated chloryl derivative with lime to form calcium hypochlorite.

An aqueous solution containing hypochlorous acid may first be prepared and subsequently treated with the amine base, or the formation of the solution containing hypochlorous acid and the treatment of the solution with the amine base may be combined and carried out simultaneously. The amine base may be supplied to the reaction as a powder and suspended or dispersed in the aqueous solution containing hypochlorite chlorine, or it may be supplied in the form of a solution, either in a solvent miscible with the aqueous solution, such as acetic acid, or in a solvent immiscible with the aqueous solution, such as carbon tetrachloride. The chloryl derivative may be separated from the aqueous solution as an insoluble precipitate, or it may be removed in solution in a solvent forming a solution with the chloryl derivative which is immiscible with the aqueous solution. The separated chloryl derivative is then hydrolyzed to form a hypochlorite and to regenerate the amine base. In general, I have found that the formation of the chloryl derivative is promoted by the presence of acid constituents and that the hydrolysis is promoted by the presence of alkaline constituents. For example, the chloramine of acetanilide is produced by treating acetanilide with hypochlorous acid under properly regulated conditions and this chloryl derivative, phenyl-acetyl-nitrogen-chloride, reacts with an alkali to form the hypochlorite of the alkali and acetanilide.

The hypochlorous acid separated in the form of a chloryl derivative of the amine base, either as such or in the form of a solution, may be treated with an alkaline substance, such as lime or other metallic base, in amount sufficient to combine with all of the available hypochlorous acid, or with an excess of the alkaline substance to promote the completion of this reaction; the resulting hypochlorite separated by extraction with water; and the hypochlorite solution concentrated by evaporation to give a dry hypochlorite product. Or a solvent forming a solution with the amine base immiscible with water may be employed for separating the amine base and the hypochlorite product formed by reaction with the alkaline substance, and an amount of alkaline substance insufficient to combine with all the available hypochlorous acid employed for reaction with the chloryl derivative so that an excess of hypochlorous acid, promoting complete conversion of the alkaline substance to hypochlorite, is present. The excess hypochlorous acid, present as a chloryl derivative, is also recovered in solution in the solvent. The alkaline substance may be supplied to the reaction in a moistened condition or in the form of a solution or suspension in water, for example, in carrying out the process to produce calcium hypochlorite, milk of lime or moistened hydrated lime may be used, accordingly as best suits the conversion of the particular chloryl derivative used.

Where the aqueous solution of hypochlorous acid is separately prepared previous to treatment with the amine base, it may be prepared by any known or suitable method, for example, by methods based upon the hydrolysis of chlorine according to the reaction $$Cl_2 + H_2O \rightleftharpoons HOCl + HCl.$$

Hypochlorous acid may thus be made by adding chlorine to water in the presence of an alkaline substance, such as sodium bicarbonate or calcium carbonate, which is hydrolyzed to such an extent that it will react with the hydrochloric acid formed without reacting with the hypochlorous acid. Other alkaline substances which may be employed include sodium carbonate, sodium hydroxide, and hydrated lime. Such a chlorinated solution is suitable for treatment with an amine base to form the corresponding chloryl derivative, or the aqueous solution containing the alkaline substance may be chlorinated in the presence of an amine base for direct production of the chloryl derivative. Concentrated solutions of commercial bleaching powder, containing calcium chloride and calcium hypochlorite, or of other suitable hypochlorite products, may also be employed for reaction with the amine base. In such solutions, the hypochlorous acid may be liberated by the addition of an acid, such as acetic acid, or the acid may be added with the amine base.

When both the chloryl derivative and the amine base are insoluble in water, a solution containing hypochlorous acid may be treated with the amine base or a solution containing an alkaline substance of the type described above may be chlorinated in the presence of an amine base and the resulting chloryl derivative separated by gravity or by filtration. For example, the amine base may be suspended in about ten parts of water containing in suspension a sufficient amount of calcium carbonate to combine with an amount of hydrochloric acid corresponding to the amount of hypochlorous acid with which the amine base will react. Mechanical agitation may be employed to maintain the suspension. The suspension may then be chlorinated until slightly more than the theoretical amount of chlorine has been introduced. The insoluble chloryl derivative formed may be filtered from the solution containing the chloride, and washed with water. Following this treatment the separated chloryl derivative may be subjected to treatment with an equivalent amount of hydrated lime, or other appropriate metallic base, and sufficient water to give a 5 to 10% solution of the corresponding hypochlorite. The amine base is regenerated by the hydrolysis of the hypochlorous acid compound and may be reused for the initial separation of hypochlorous acid from the solution containing chloride. The filtrate, consisting principally of a solution of the hypochlorite, may then be evaporated to dryness in a vacuum and the crystallized salt dried, for example, by heating at a temperature of about 50° C.

When both the chloryl derivative and the amine base are soluble in an inert solvent which is immiscible with water, or which forms a solution with the chloryl derivative which is immiscible with water, such for example as carbon tetrachloride, chloroform, ethylene chloride, benzene or xylene, a solution of hypochlorous acid may be prepared, for example by chlorinating an aqueous suspension of calcium carbonate, and this hypochlorous acid solution may then be subjected to treatment with a solution of the amine base in the solvent. The hypochlorous acid is thus combined with the amine base and the resulting chloryl derivative is separated in solution in the solvent. The solvent solution containing the available hypochlorous acid may then be treated with a solution of a suitable alkaline substance for the formation of the corresponding hypochlorite and regeneration in the solvent of the amine base. The regenerated solvent solution of the amine base may then be again employed for the initial separation of hypochlorous acid from the aqueous solution containing chloride.

In carrying out the process of the present invention, I have found it particularly advantageous to employ the various acyl derivatives of aniline, for example, acetanilide, para-nitro-acetanilide, para-nitro-benzanilide, para-chlor-acetanilide, acetyl-para-toluidine, and acetyl-methyl-anthranilate.

While the methods I have described are generally applicable, certain of these methods are particularly adapted to use with certain amine bases and the chloryl derivatives formed therewith. Para-nitro-acetanilide and para-chlor-acetanilide, for example, are well adapted for use in connection with operations in which a suspension of the amine base together with an appropriate alkaline substance is chlorinated and the precipitated chloryl derivative treated with a moist alkaline substance. The chloryl derivative of para-nitro-benzanilide may with advantage, be formed by reacting between a concentrated bleaching powder solution and a solution of the amine base in a concentrated acetic acid solution. With acetanilide, the formation of the chloryl derivative is best carried out rapidly and at a low temperature. The chloryl derivative of acetyl-methyl-anthranilate is advantageously prepared by treating a carbon tetrachloride solution of the amine base with a chlorinated suspension of calcium carbonate, and the resulting carbon tetrachloride solution of the chloryl derivative can then be treated with a solution or suspension of the metallic base, for example with milk of lime to produce calcium hypochlorite. It will be apparent, however, that many variations are possible.

The amine base employed in carrying out the process of the present invention should be relatively stable, particularly toward oxidation by hypochlorous acid or hypochlorites, and should form a chloryl derivative which is stable and which can be hydrolyzed sufficiently for effective recovery of the hypochlorous acid and which permits regeneration of the amine base.

The production of calcium hypochlorite in accordance with the process of the invention will be further illustrated by the following example:—310 pounds of para-nitro-acetanilide in finely divided condition and 86 pounds of pulverized limestone are maintained in suspension in 50 gallons of water by vigorous mechanical agitation while chlorine is introduced into the mixture. The chlorine is introduced rapidly at first and more slowly as the reaction proceeds. When chlorine is no longer absorbed, the reaction mass is filtered. The filtrate may be used as a medium in which to suspend the next charge of limestone and amine base, and it may be used in this manner repeatedly until the concentration of calcium chloride increases to an objectionable degree, say for example 15%, when it may be discarded. The filter cake obtained contains about 300 lbs. of para-nitro-phenyl-acetyl-nitrogen-chloride and about 60 pounds of unconverted para-nitro-acetanilide. This filter cake is washed with a small amount of water to remove any adhering calcium chloride solution. The washed filter cake is then transferred to one or more ball mills constructed of stoneware in which it is mixed with about 8 parts by weight of a water and ice mixture containing enough ice to maintain the temperature of the reaction mass between about 0° and 5° C. After the chloryl derivative of the amine base and the ice and water have been mixed for two or three minutes, 56 pounds of hydrated lime are added and the ball mill is operated for about 5 minutes longer. The mass is then filtered immediately and the filter cake is washed. The washed filter cake comprises the unconverted para-nitro-acetanilide and the regenerated para-nitro-acetanilide. The filtrate is evaporated to dryness in a vacuum evaporator, for example, in a type of evaporator in which a thin film of the solution is brought quickly to the required temperature and the solid resulting removed from the heated zone as quickly as possible, and then dried in air at about 50° C. The dry product consists of about 100 pounds of powder containing 85 to 90% of available chlorine with small amounts of lime and calcium chlorine present as impurities.

The amine base is regenerated in the treatment of the chloryl derivative with an alkaline substance to form the hypochlorite product, and can advantageously be employed in a cyclic manner, the regenerated amine base and any associated unconverted amine base being returned to the initial treatment of the aqueous solution of the hypochlorous acid so that the same intermediate is used over and over again for separating the hypochlorous acid from its aqueous solution and for reaction with the alkaline substance to form the hypochlorite. Where the amine base is employed directly it may be returned after separation from the hypochlorite product. Where the amine base is employed in solution in a solvent of the character described, it is regenerated in the solvent and the regenerated solvent solution may be reused in the treatment of further quantities of the aqueous solution of hypochlorous acid.

I claim:

1. The method of producing hypochlorites which comprises preparing an aqueous solution containing hypochlorite chlorine and a chloride, treating said solution with an amine base capable of reacting with hypochlorous acid to form a chloryl derivative of the amine base, separating the resulting chloryl derivative of the amine base from the solution without removing the chloride, and treating the separated chloryl derivative with an alkaline compound of a metal to form the corresponding hypochlorite.

2. The method of producing hypochlorites which comprises forming a chloryl derivative of an amine base by reaction between an amine base capable of reacting with hypochlorous acid to form a chloryl derivative and an aqueous solution containing hypochlorite chlorine, separating the chloryl derivative from the aqueous solution, and causing the separated chloryl derivative to react with an alkaline compound of a metal to form the corresponding hypochlorite.

3. The method of separating hypochlorous acid from aqueous solutions which comprises treating the solution with an amine base with which hypochlorous acid will combine to form a chloryl derivative insoluble in water and which will react with an alkali to form a hypochlorite.

4. The method of separating hypochlorous acid from aqueous solutions which comprises treating the solution with an acyl derivative of an amine base with which the hypochlorous acid will combine to form a chloryl derivative insoluble in water and which will react with an alkali to from a hypochlorite.

5. The method of separating hypochlorous acid from a solution containing the same, which comprises treating such solution with an amine base capable of reacting with hypochlorous acid to form a chloryl derivative of the amine base, separating the chloryl derivative of a solution, and hydrolyzing the separated chloryl derivative to recover the hypochlorous acid.

6. The method of producing compounds of hypochlorous acid which comprises causing chlorine to react with aqueous solutions or suspensions of alkaline substances to form aqueous solutions containing hypochlorous acid and chlorides, and separating hypochlorous acid from the solution by treatment with an amine base with which the hypochlorous acid will combine to form a chloryl derivative insoluble in water and which will react with an alkali to form a hypochlorite.

7. The method of producing hypochlorites which comprises forming a chloryl derivative of an amine base by reaction between a solution of an amine base capable of reacting with hypochlorous acid to form a chloryl derivative in a solvent immiscible with water and an aqueous solution containing hypochlorite chlorine, separating the chloryl derivative from the aqueous solution in solution in the solvent, and causing the separated solvent solution of the chloryl derivative to react with an alkaline compound of a metal to form the corresponding hypochlorite.

8. The method of separating hypochlorous acid from aqueous solutions which comprises treating the aqueous solution with a solution containing an amine base, capable of reacting with hypochlorous acid to form a chloral derivative, in a solvent immiscible with water to form a chloryl derivative soluble in the solvent.

9. The method of producing hypochlorites which comprises forming a chloryl derivative by reaction between a mono-acyl derivative of aniline and an aqueous solution containing hypochlorite chlorine, separating the chloryl derivative from the aqueous solution, and causing the separated chloryl derivative to react with an alkaline compound of a metal to form the corresponding hypochlorite.

10. The method of separating hypochlorous acid from aqueous solutions which comprises treating the solution with a mono-acyl derivative of aniline.

11. The method of separating hypochlorous acid from aqueous solutions which comprises treating the solution with an amine base with which the hypochlorous acid will combine to form a chloryl derivative insoluble in water and which will react with an alkali to form a hypochlorite, separating the chloryl derivative from the aqueous solution, and causing the separated chloryl derivative to react with a metallic base to form the corresponding hypochlorite.

12. The method of producing hypochlorites which comprises forming a chloryl derivative by reaction between an amine base, capable of reacting with hypochlorous acid to form a chloryl derivative, and an aqueous solution containing hypochlorite chlorine, separating the chloryl derivative from the aqueous solution, causing the separated chloryl derivative to react with an alkaline compound of a metal to form the corresponding hypochlorite and to regenerate the amine base, and returning the regenerated amine base for reaction with further amounts of aqueous solution containing hypochlorite chlorine in a cyclic manner.

13. The method of producing hypochlorites which comprises forming a chloryl derivative of an amine base by reaction between a solution of an amine base, capable of reacting with hypochlorous acid to form a chloryl derivative, in a solvent and an aqueous solution containing hypochlorite chlorine, separating the chloryl derivative from the aqueous solution and causing the separated chloryl derivative to react with an alkaline compound of a metal to form the corresponding hypochlorite.

14. The method of producing hypochlorites which comprises forming a chloryl derivative of an amine base by reaction between an amine base, capable of reacting with hypochlorous acid to form a chloryl derivative, and an aqueous solution containing hypochlorite chlorine in the presence of acetic acid, separating the chloryl derivative from the aqueous solution, and causing the separated chloryl derivative to react with an alkaline compound of a metal to form the corresponding hypochlorite.

In testimony whereof I affix my signature.

MAURICE C. TAYLOR.